(12) United States Patent
Brown (10) Patent No.: US 9,314,106 B2
(45) Date of Patent: Apr. 19, 2016

(54) BED STEP DEVICE AND METHOD

(71) Applicant: Timothy Brown, Galena, IL (US)

(72) Inventor: Timothy Brown, Galena, IL (US)

(*) Notice: Subject to any disclaimer, the term of this patent is extended or adjusted under 35 U.S.C. 154(b) by 0 days.

(21) Appl. No.: 14/739,458

(22) Filed: Jun. 15, 2015

(65) Prior Publication Data

US 2015/0272337 A1   Oct. 1, 2015

Related U.S. Application Data

(63) Continuation of application No. 13/292,570, filed on Nov. 9, 2011, now Pat. No. 9,055,824.

(51) Int. Cl.
 *A47C 21/00* (2006.01)
 *A01K 1/035* (2006.01)

(52) U.S. Cl.
 CPC .............. *A47C 21/00* (2013.01); *A01K 1/035* (2013.01); *Y10T 29/49826* (2015.01)

(58) Field of Classification Search
 CPC ........................................................ A47C 21/00
 USPC .................... 5/507.1, 658, 662; 119/843, 847
 See application file for complete search history.

(56) References Cited

U.S. PATENT DOCUMENTS

| | | |
|---|---|---|
| 2,563,436 A | 8/1951 | Toth |
| 3,462,170 A | 8/1969 | Smith et al. |
| 4,168,764 A | 9/1979 | Walters |
| 4,359,793 A | 11/1982 | Hosono |
| 4,524,475 A | 6/1985 | Valentino |
| 4,937,902 A | 7/1990 | Ceike Shapiro |
| 4,982,464 A | 1/1991 | Lucero |
| 5,161,484 A | 11/1992 | Duane |
| 5,213,060 A | 5/1993 | Sloan et al. |
| 5,592,801 A | 1/1997 | Balzer |
| 5,634,440 A | 6/1997 | Mogck |
| 5,724,685 A | 3/1998 | Weismiller et al. |
| 5,829,380 A | 11/1998 | Smith |
| 5,870,788 A | 2/1999 | Witkin |
| 5,924,383 A | 7/1999 | Smith |
| 5,940,910 A | 8/1999 | Weismiller et el. |
| 6,119,634 A | 9/2000 | Myrick |
| 6,267,082 B1 | 7/2001 | Naragon et al. |
| 6,516,752 B2 | 2/2003 | Batterton |
| 6,536,372 B1 | 3/2003 | Loeser |
| 6,691,645 B1 | 2/2004 | Ayers, Jr. |
| 6,715,177 B1 | 4/2004 | Lagergren-Julander |
| 6,928,959 B1 | 8/2005 | Truernicht et al. |
| 6,964,246 B2 | 11/2005 | Wolfington et al. |
| 6,968,810 B2 | 11/2005 | Bishop |
| 7,011,045 B1 | 3/2006 | Zehner |
| D548,898 S | 8/2007 | Northrop et al. |
| 7,621,236 B2 | 11/2009 | Steffey et al. |

(Continued)

*Primary Examiner* — Fredrick Conley
(74) *Attorney, Agent, or Firm* — Hinshaw & Culbertson LLP (57) ABSTRACT

A bed step device is provided for assisting a human or pet in climbing into and/or out of a bed. The device includes a base, at least one step attached to the base, and a retention member attached to the base. The retention member is configured to be disposed and retained between opposed surfaces of a bed, typically either the opposed surfaces of a mattress and a box spring or those of a box spring and a bed frame. The disposition of the retention member between the opposed surfaces results in a retention force, typically a friction force, to resist sliding movement of the device across a floor surface on which the device is supported. The retention member may be a rigid panel or a flexible sheet. The base and step or steps may comprise a folding staircase linkage or a rigid, unitary housing including a storage compartment.

20 Claims, 10 Drawing Sheets

(56) References Cited

U.S. PATENT DOCUMENTS

| | | |
|---|---|---|
| 7,766,357 B2 | 8/2010 | Arvanites |
| D640,015 S | 6/2011 | Birck |
| 9,055,824 B2 * | 6/2015 | Brown .................. A47C 21/00 |
| 2003/0154669 A1 | 8/2003 | Vandaan |
| 2004/0244724 A1 | 12/2004 | Runge |
| 2005/0056233 A1 | 3/2005 | O'Leary et al. |
| 2005/0115522 A1 | 6/2005 | Bishop |
| 2006/0137266 A1 | 6/2006 | Whalen |
| 2006/0180097 A1 | 8/2006 | Notine |
| 2006/0225372 A1 | 10/2006 | Gonzalez |
| 2007/0089690 A1 | 4/2007 | Khubani et al. |
| 2007/0131178 A1 | 6/2007 | Edgar |
| 2007/0289556 A1 | 12/2007 | Hoffman et al. |
| 2009/0188444 A1 | 7/2009 | Whalen |
| 2010/0083913 A1 | 4/2010 | Gibson |
| 2011/0017547 A1 | 1/2011 | Lee et al. |
| 2011/0061972 A1 | 3/2011 | Parvizian et al. |
| 2011/0131902 A1 | 6/2011 | Young |

* cited by examiner

BED STEP DEVICE AND METHOD

CROSS-REFERENCE TO RELATED APPLICATION

This application is a continuation application of application Ser. No. 13/292,570, filed Nov. 9, 2011, pending, the entire specification of which is incorporated by reference.

FIELD OF THE INVENTION

The present invention relates to portable step/staircase devices for assisting a human or pet in climbing into a bed (generally referred to herein as "bed step devices"). More particularly, it relates to improved bed step devices having improved means of preventing the devices from sliding away from a use position adjacent to a bed.

BACKGROUND OF THE INVENTION

Many beds include tall frames, thick mattresses and/or box springs, built-in drawers or other storage space located underneath the sleeping area, or some combination of these features. Additionally, it is common to mount a bed frame on bed risers to increase the storage space available underneath a bed frame. While all of these adaptations increase the comfort and/or convenience provided by a bed, they also tend to increase the level of the sleeping surface (generally referred to herein as the top surface of a mattress) above the floor surface on which the bed is supported. As a result, the bed may be too tall for its human user to readily sit down on the mattress from a standing position on the floor, and/or it may be too tall for a pet to readily climb onto the mattress from the floor. Thus, bed step devices exist, providing one or more steps for the human or pet to climb to a position from which the human may comfortably sit down onto the mattress or the pet may readily climb onto the mattress. Human bed step devices and pet bed step devices are analogous in purpose and function, with a practical difference being that human bed step devices typically do not need to be nearly as tall as pet bed step devices. This is not only because an adult human user, with rare exceptions, is taller than any common breed of pet, but also because the upright stature of humans enables us to readily shift our whole body onto a surface by first sitting onto the surface and then scooting backward or twisting while swinging our legs up. This process only requires raising our hips above the level of the top of the mattress, whereas our four-legged companions can only comfortably reach the mattress by stepping onto it with all four paws, which requires first raising their paws to a level from which it is comfortable for them to step or jump onto the mattress.

In either type of bed step device, human or animal, sliding movement of the device on a floor surface, whether due to a transfer of horizontal momentum from a human or pet stepping onto the device or any incidental bumping of the device that occurs during or just before the ascent of the human or animal onto the device, may cause the human or animal to lose his or her balance and potentially to fall and sustain injury. Thus, it is important for safety, in addition to convenience, that the device remain stationary during and preceding a human's or pet's use of the device to climb into a bed.

Additionally, bed step devices occupy a significant amount of space. This is especially true of pet step devices, because, being generally taller, they also must be generally longer to avoid being too steep for a pet to climb. Thus, it is desirable for a bed step device to incorporate storage space to offset the floor space occupied by the device.

A need therefore exists for an improved bed step device adapted to remain stationary when a user (for purposes of the present description, "user" shall refer generically to a human or other animal user) climbs onto the device and from the device onto a bed, and incorporating storage space.

BRIEF SUMMARY OF THE INVENTION

In accordance with one aspect of the present invention, a portable bed step device is provided for assisting a human or pet in climbing into a bed. The device comprises a base configured to be supported on a generally horizontal floor surface, at least one step connected to the base, and a thin, elongate retention member connected to the base. The step includes a generally horizontal support surface configured to be elevated above the generally horizontal floor surface when the base is supported thereon, and the thin retention member is adapted to be disposed and retained between opposed surfaces of the bed, when the device is in a use position adjacent to the bed, to resist movement of the device away from the use position. That is to say, where a "bed" is understood to comprise at least two stacked together components, typically including at least a mattress and a frame, and usually also including a box spring disposed between the mattress and the frame, the retention member is adapted to be disposed and retained between opposed, contacting surfaces of two of the stacked components. Then, for example, friction forces from the opposed surfaces act on the retention member to resist pulling the retention member out from between the opposed surfaces, to resist movement of the device away from the use position.

In one embodiment, the device further comprises a storage compartment disposed in the base and below the support surface.

In another embodiment, the device further comprises a linkage movably connecting the support surface to the base. The linkage is adapted to permit movement of the support surface to a range of positions at a range of heights above a floor surface on which the base is supported, while constraining the support surface to remain generally parallel to the floor surface. For example, the linkage may be a folding staircase. Optionally, the linkage comprises at least two substantially parallel side links pivotally connected to the base and to the support surface, the substantially parallel side links having substantially parallel, spaced apart pivotal axes. The linkage may comprise a second support surface connected to the first support surface by a second linkage, the second linkage adapted to permit movement of the second support surface to a range of positions at a range of heights above the first support surface, while constraining the second support surface to remain generally parallel to the first support surface.

In still another embodiment, the retention member comprises a generally horizontally disposed, thin, rigid panel configured to be disposed and retained between opposed surfaces of a mattress and a box spring. The thin rigid panel may be rigidly connected to the base or movably connected to the base. For example, the thin rigid panel may be horizontally slidingly connected to the base, for movement to and from an extended position and a retracted position relative to the base, and configured to be disposed and retained between the opposed surfaces when in the extended position. The device is preferably generally more compact when the thin rigid panel is in the retracted position, to facilitate storage of the device, or use of the device not in conjunction with assisting a human or animal in climbing into a bed, with its back side against a wall, for example. Further, the device may include a plurality of the thin rigid panels horizontally slidingly connected to the base, the plurality of thin rigid panels being spaced apart vertically from one another, to adapt the device to a range of heights of the opposed surfaces. Alternatively, the thin rigid panel may be vertically slidingly connected to the base for adjustment of the height of the thin rigid panel to the height of the opposed surfaces. In still another alternative arrangement, the thin rigid panel may be pivotally connected to the base for movement to and from a folded storage position and an unfolded use position for retention of the thin rigid panel between the opposed surfaces.

In yet another embodiment, the retention member comprises a flexible sheet attached to the base. A rod may be attached to an end of the flexible sheet opposite an end of the flexible sheet connected to the base, configured for rolling the flexible sheet onto the rod. In addition or alternatively, a plurality of transverse ribs may be attached to the flexible sheet in a longitudinally spaced-apart relationship, to aid in traction. A proximal end of the flexible sheet may be attached to the base, the flexible sheet being configured to be disposed and retained between opposed surfaces of a box spring and a bed frame. Means for removably fastening a distal end of the flexible sheet extending from between the opposed surfaces to the base may also be included.

In still another embodiment, the device further comprises floor-contacting members (such as legs) extendably and retractably connected to the base to adjust the height of the base and the support surface relative to the generally horizontal floor surface.

In yet another embodiment, the device further comprises floor grip members attached to the base and configured to directly contact a floor surface on which the base is supported, the floor grip members composed of a high-traction material to resist sliding of the grip members across the floor surface.

In another aspect, the present invention provides a method of assisting a human or pet in climbing into a bed. The method comprises providing a portable bed step device comprising a base, a step having a support surface, and a thin, elongate retention member connected to the base substantially as described above. In further accordance with the method, the device is placed in a use position, wherein the base is supported on a generally horizontal floor surface adjacent the bed, and the support surface is elevated above the floor surface and disposed below the level of the top of the bed, so that a user is permitted to climb from the floor surface onto the support surface and from the support surface onto the bed. The method further comprises disposing and retaining the retention member between opposed surfaces of the bed to resist movement of the device away from the use position.

In still another aspect, the present invention provides a method of making a portable bed step device for assisting a human or pet in climbing into a bed. The method comprises forming a base configured to be supported on a generally horizontal floor surface, forming at least one step fixed to the base, forming on the step a generally horizontal support surface configured to be elevated above the generally horizontal floor surface when the base is supported on the generally horizontal floor surface; and forming a thin, elongate retention member connected to the base. The thin retention member is formed to be disposed and retained between opposed surfaces of the bed, when the device is in a use position adjacent to the bed, to resist movement of the device away from the use position.

In one embodiment, the method further comprises forming a storage compartment disposed below the support surface, as device described above with respect to the device of the invention. The method may still further comprise mounting a sliding drawer in the storage compartment or attaching a door adjacent an opening of the storage compartment for access thereto. Where a door is attached, the door may be comprised in a support surface of the step, the door being adapted to pivot open about a horizontal axis, like the lid of a chest. This allows access to the storage compartment without a user having to bend down far as might be required for access to the compartment from the side.

DETAILED DESCRIPTION OF THE INVENTION

Improved bed step devices and methods are described in this section, with reference to the accompanying Figures. In particular, the bed step devices include a retention member that is configured to be retained and held stationary relative to a bed, for example by friction forces, preferably between a mattress and a box spring. In each device, the retention member is connected to a base of the device, where "connected to the base" means either directly connected to the base or indirectly connected to the base through one or more other members of the device. In some embodiments, the bed step devices include one or more storage compartments below the steps.

Figure 1:
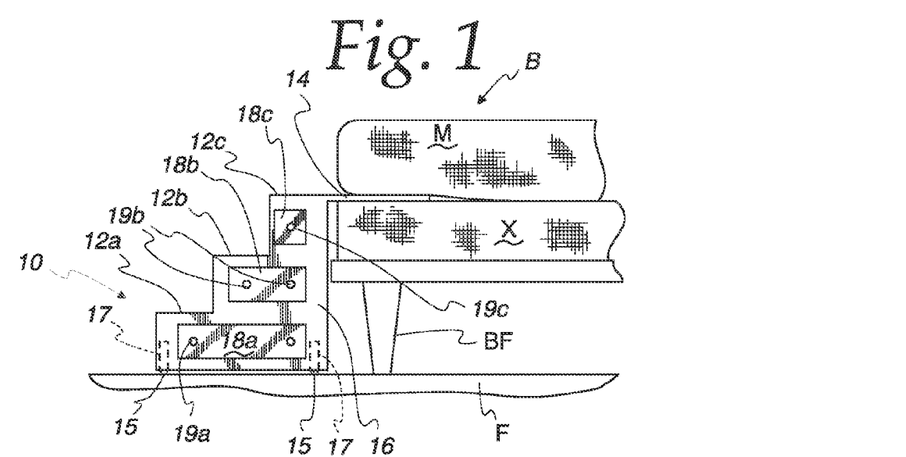
FIG. 1 is a side elevation view of one embodiment of a device according to the invention in a use position adjacent a bed.

Turning to FIG. 1, a bed step device 10 includes steps 12a, 12b, and 12c and a retention panel 14, integral to a rigid housing 16. Drawers 18a, 18b and 18c, having drawer pulls 19a, 19b and 19c, are slidingly mounted in housing 16, as one manner of providing readily accessible storage space therein. Bed step device 10 is depicted in its use position supported on a horizontal floor surface F adjacent a bed B having a tall bed frame BF, in which retention panel 14 is disposed and retained between a mattress M and a box spring X of bed B. Retention panel 14 is shown frictionally retained between mattress M and box spring X of bed B. Frictional forces applied to retention panel 14 by mattress M and box spring X resist sliding movement of device 10 away from the use position illustrated in FIG. 1. Preferably, retention panel 14 is composed of a material having a rough surface to enhance friction between retention panel 14 and the opposed contacting surfaces of mattress M and box spring X, such as a particle wood material, for example. Preferably, device 10 includes adjustable legs 15, suitably mounted for vertical movement into and out of leg recesses 17 in housing 16, which are configured to support housing 16 on floor surface F at a range of vertical levels to align retention panel 14 with the height of the opposed surfaces of mattress M and box spring X for placement and retention therebetween. This height may vary considerably from one bed to another, typically depending at least in part on the height of a bed frame BF and the thickness of box spring X. Legs 15 may thread into recesses 17 to be extended and retracted by twisting in opposite directions, or they may slidingly engage recesses 17. In the case of sliding engagement, an appropriate locking means such as a spring-loaded pin or set screw (not shown) may be employed to hold legs 15 in place once adjusted to the desired height.

Figures 2, 3:
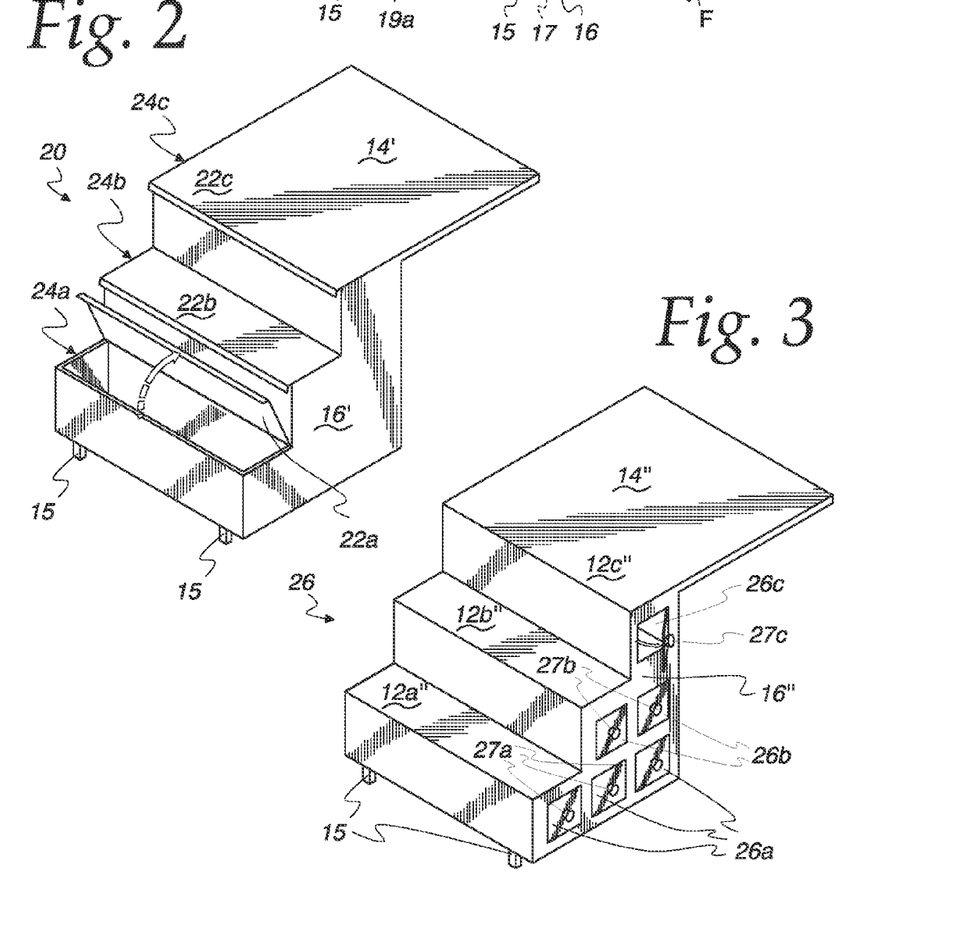
FIG. 2 is a perspective view of an alternative embodiment of a device according to the invention.
FIG. 3 is a perspective view of another alternative device.

Storage is most frequently depicted in the Figures as drawers, because drawers are easily shown in the side elevation views that lend themselves to illustrating the function of retention panels according to the invention. However, as alternatives to drawers, any other suitable type of storage structure within housing 16 is also within the scope of the invention, including, for example, cubby holes, shelving, and carousels/Lazy Susans (not shown), in any suitable combination. The storage space may be open from the side or covered in some other way than by drawers 18a-18c. For example, an alternative bed step device 20 includes a housing 16' with a rigidly attached retention panel 14' and one or more pivotally attached chest lids 22a-22c that double as the stepping surfaces of steps 24a-24c as illustrated in FIG. 2. One advantage of chest-style storage space that opens from the top via lids 22a-22c, as opposed to storage space that opens from the side, is that one need not bend down as far to access and/or look inside the storage space. In another alternative bed step device 26, a housing 16" includes steps 12a"-12c", an attached retention panel 14", and pivotally mounted cabinet doors 26a-26c with handles 27a-27c on the side of a housing 16", as illustrated in FIG. 3.

Figures 4, 6:
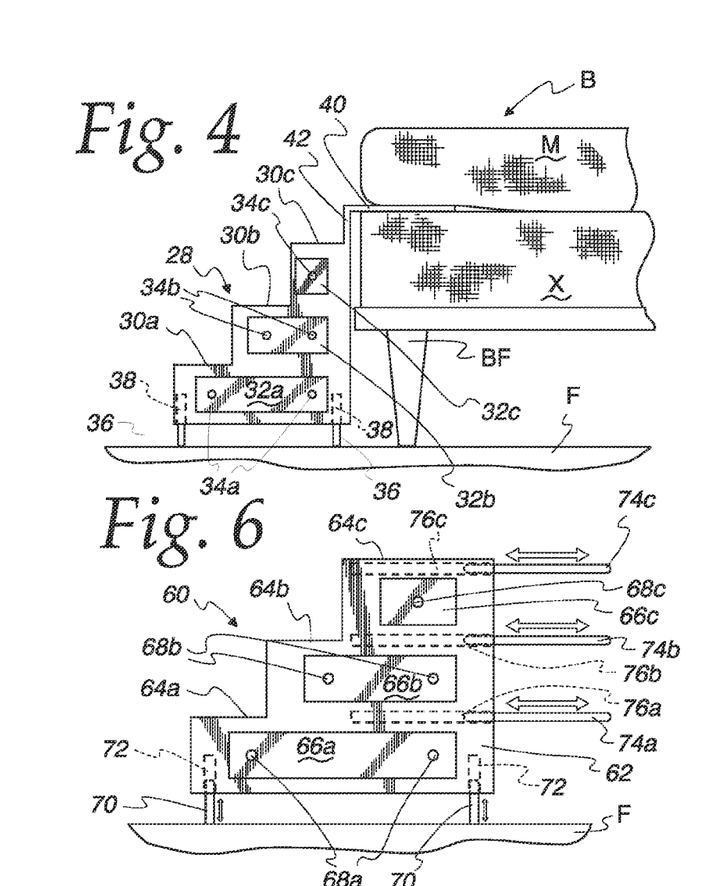
FIG. 4 is a side elevation view of still another alternative device in a use position.
FIG. 6 is a side elevation view of still another alternative device.

Although retention panel 14, 14', 14" as shown in FIGS. 1-3 is attached to housing 16, 16', 16" at the level of the highest step 12c, 22c, 12c", a retention panel may be attached higher or lower as desired. For example, as depicted in FIG. 4, a bed step device 28, having steps 30a-30c, drawers 32a-32c with drawer pulls 34a-34c, and adjustable legs 36 with corresponding leg recesses 38, may include a retention panel 40 that is supported above top step 30c by a vertical panel 42. In this case, the vertical distance between the feet of a user standing on top step 30c and the top of mattress M is approximately the sum of the thickness of mattress M and the height of vertical panel 42. This type of arrangement is more appropriate for a human bed step device than a pet bed step device, as a human would most readily be able to sit down onto the top of mattress M when standing on a surface located some distance below the bottom of mattress M. How much lower the top of top step 30c should be than the bottom of mattress M depends in part on the height of the individual human user, and the height of vertical panel 42 should be selected accordingly.

Figure 5:
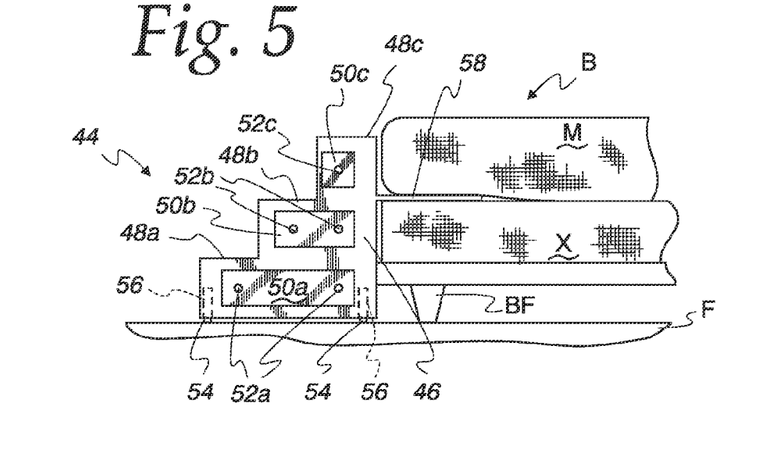
FIG. 5 is a side elevation view of yet another alternative device in a use position.

Turning to FIG. 5, another alternative embodiment is illustrated. A bed step device 44 includes a housing 46 having integral steps 48a-48c, drawers 50a-50c with drawer pulls 52a-52c, adjustable legs 54 with corresponding leg recesses 56, and a retention panel 58 attached to housing 46 at a location below the top surface of a top step 48c, so that the top surface of top step 48c may be above the bottom of mattress M. It will be apparent that this positioning of retention panel 58 is better suited to use of bed step device 44 by a pet than by a human, to facilitate stepping onto, as opposed to sitting onto, mattress M.

Figure 7:
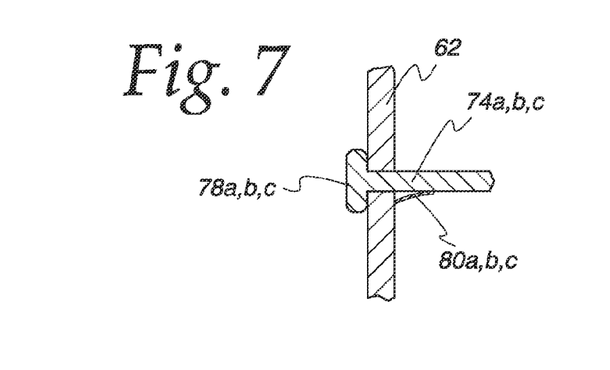
FIG. 7 is a fragmentary cross-sectional side view of a rear housing panel and retention panel of the device depicted in FIG. 6, illustrating locking and stop mechanisms thereof.

Yet another embodiment is illustrated in FIG. 6. A bed step device 60 includes a housing 62 having integral steps 64a-64c, slidingly mounted drawers 66a-66c with drawer pulls 68a-68c, adjustable legs 70 suitably mounted in leg recesses 72, and a plurality of extendable and retractable retention panels 74a-74c slidingly mounted in retention panel recesses 76a-76c in housing 62 at various levels. In conjunction with adjustable height legs 70, the inclusion of retractable retention panels 74a-74c at various levels permits device 60 to be adaptable to a wide range of heights of the top of a box spring. One of retention panels 74a-74c may be extended from housing 62 for insertion of the extended retention panel between a mattress and a box spring. Preferably, the adjustable height range of legs 70 provides for a range of fine adjustment that is at least about equal to the vertical spacing between pairs of adjacent retention panels 74a-74c, so that device 60 may be adjusted for a continuous range of box spring heights. Alternatively, it may be desirable to incorporate more than three, or as few as one, extendable and retractable retention panels in a bed step device similar to device 60 illustrated in FIG. 6. One disadvantage of including more than one extendable and retractable retention panel is that each panel, when retracted, tends to impinge on the available storage space within the housing of a device, by imposing, for example, a shorter height limit on drawers. As illustrated in the fragmentary enlarged view of FIG. 7, means to prevent each retention panel 74a, 74b, 74c from being pulled out of and separated from housing 62 must be included, such as a transversely protruding stop flange 78a, 78b, 78c, for example. Also, each retention panel 74a-74c preferably includes a suitable detent or other locking mechanism, such as a flexible stop member 80a, 80b, 80c shown in FIG. 7, to keep retention panel 74a, 74b, 74c in the extended position as retention panel 74a, 74b, 74c is being inserted between a mattress and box spring. When retention panel 74a, 74b, 74c is in the locked extended position, the locking mechanism should be configured to be readily disengaged manually, such as by depressing flexible stop member 80a, 80b, 80c, to reinsert retention panel 74a, 74b, 74c into housing 62. Alternatively, a retention panel could be configured to freely slide into a housing from the extended position, but this may require a user to lift up a mattress while inserting the retention panel under the mattress, and then set the mattress down on top of the retention panel, to avoid the retention panel being pushed back into housing by friction or other forces from the mattress and box spring.

Figures 8, 9, 10:
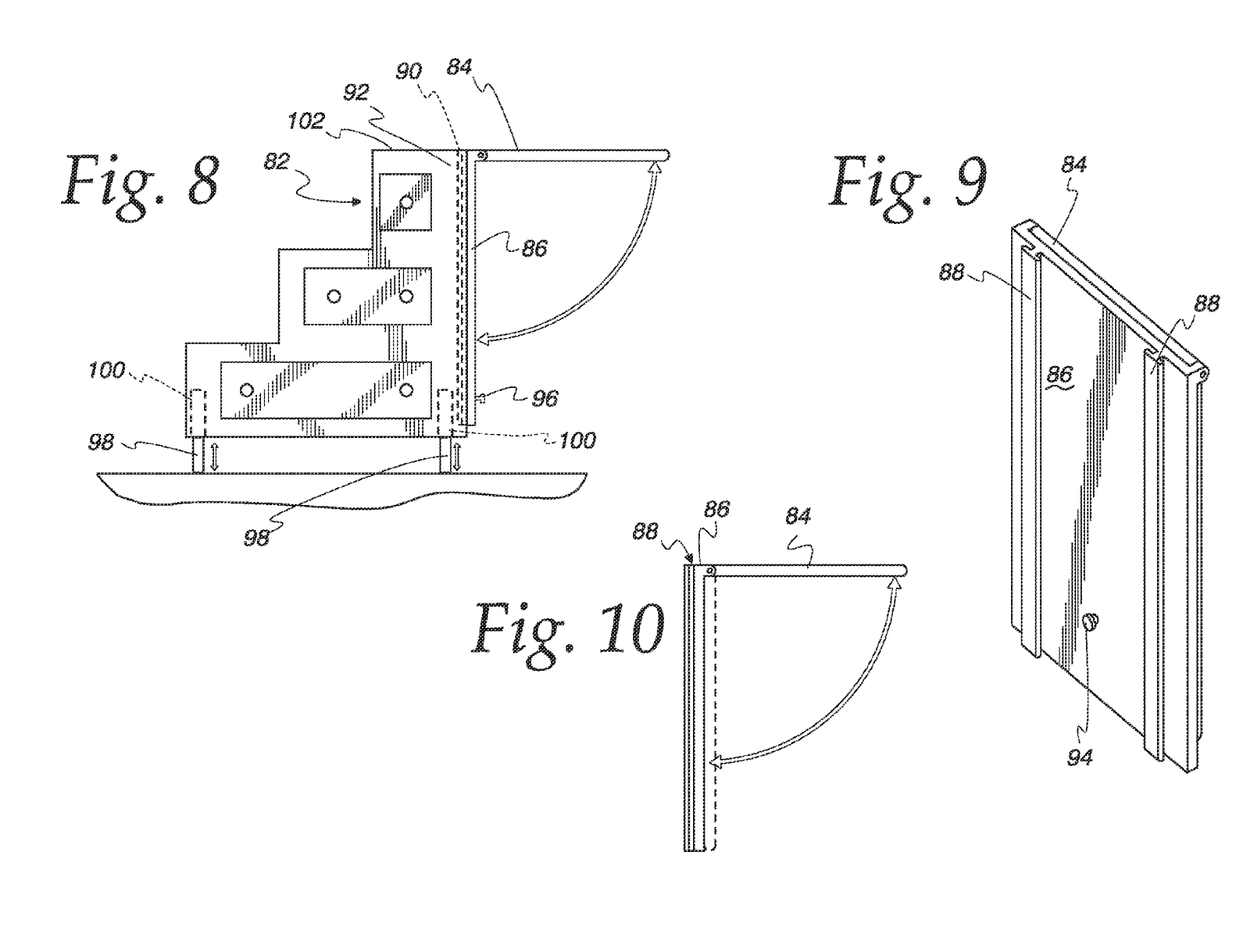
FIG. 8 is a side elevation view of yet another alternative device.
FIG. 9 is a perspective view of a rear mounting panel and retention panel of the device depicted in FIG. 8.
FIG. 10 is a side elevation view of the rear mounting panel and retention panel depicted in FIG. 9.

Still another embodiment of a device according to the invention is illustrated in FIG. 8, in which bed step device 82 incorporates a pivotal retention panel 84 hingedly connected to a height-adjustable rear mounting panel 86. Rear mounting panel 86 includes ribs 88, depicted in FIGS. 9 and 10, for mating with complementary slots 90 in a rear side of a housing 92, as shown in FIG. 8, for vertically slidingly connecting rear mounting panel 86 to housing 92. Thus, in accordance with a method of using device 82, a user first slidingly adjusts the top of rear mounting panel 86 to the height of the top of a box spring and the bottom of a mattress; locks rear mounting panel 86 at the adjusted position relative to housing 92 by engaging a locking pin 94, for example by twisting or releasing a locking knob 96, depicted in FIG. 8; swings pivotal retention panel 84 to a horizontal orientation; and inserts horizontally oriented pivotal retention panel 84 between the mattress and box spring to frictionally retain device 82 in a use position. Optionally, height adjustable legs 98 mounted in leg recesses 100 may also be included so that a user may first adjust the height of a top step 102 to a desired position relative to the height of the top of a mattress before performing the foregoing steps to insert pivotal retention panel 84.

Yet another embodiment of a bed step device according to the invention is illustrated in FIGS. 11-15. A bed step device 104, shown in FIG. 11 in its use position, adjacent a bed B having a mattress M, box spring X and bed frame BF mounted on a riser R, includes a flexible retention sheet 106 in lieu of a rigid retention panel as described in the foregoing embodiments. In accordance with this embodiment, one end of sheet 106 is attached at a rear side of a housing 107 of device 104, and an opposite end of sheet 106 is inserted and frictionally retained between a box spring X and a mattress M. For enhanced frictional retention, retention sheet 106 may optionally include a rod 108 at its opposite end, one or a plurality of frictional ribs similar to ribs 184 depicted in FIG. 24 for a flexible retention sheet 180, in accordance with a folding staircase embodiment described in more detail below, or any other suitable friction enhancing features or members. Advantageously, rod 108 may also be used as a spool for rolling up sheet 106, for compact storage of sheet 106 when device 104 is not in use as a bed step device. Housing 107 includes storage in the form of drawers 109 equipped with drawer pulls 110.

Figure 11:
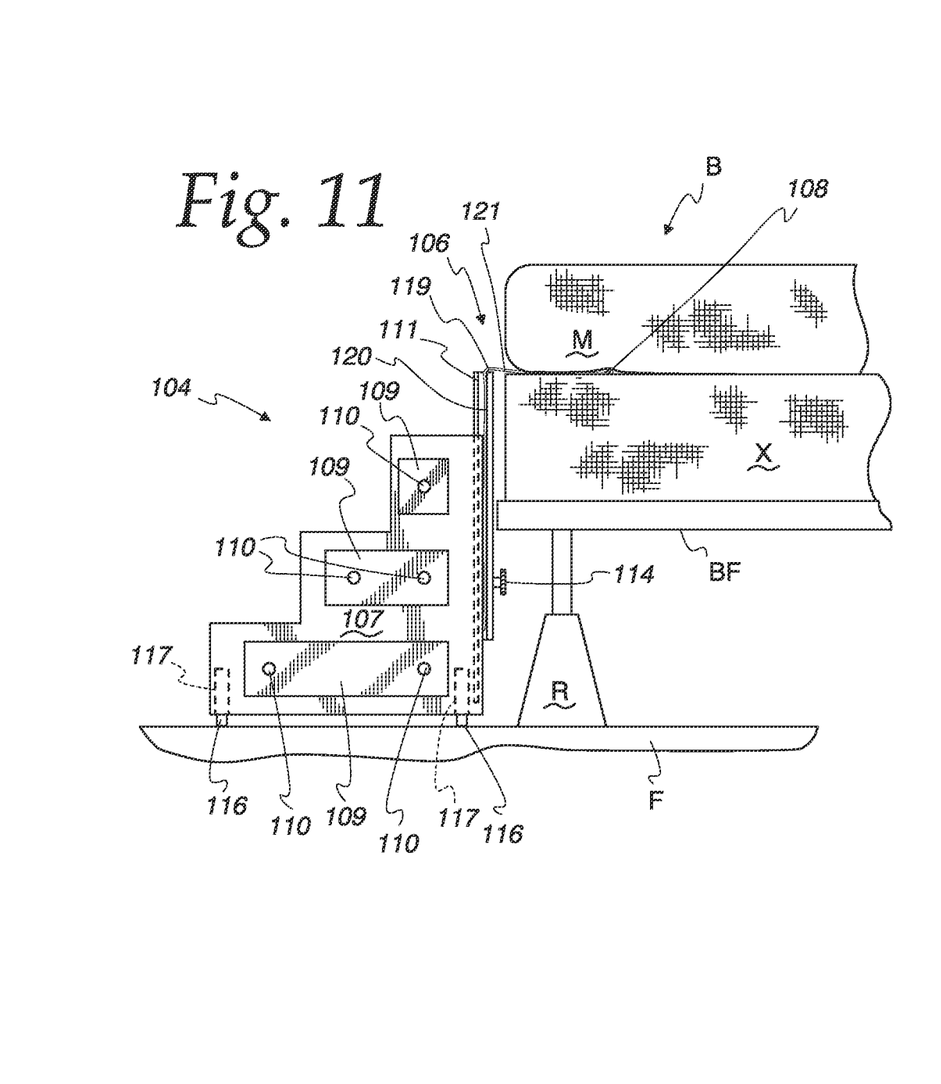
FIG. 11 is a side elevation view of yet another alternative device shown in a use position.
Figure 12:
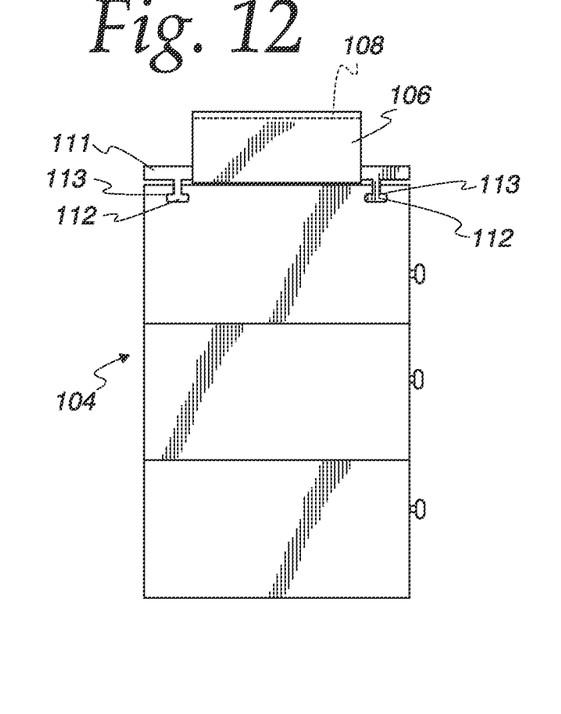
FIG. 12 is top plan view of the device depicted in FIG. 11.
Figure 13:
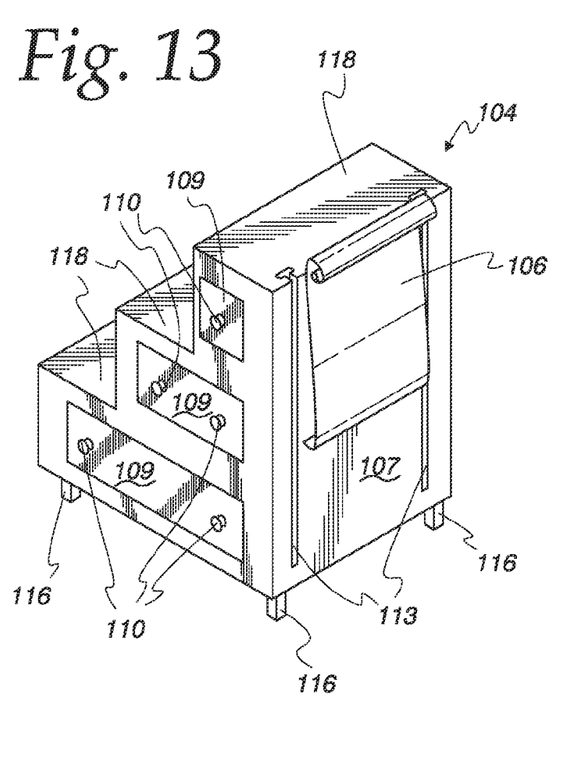
FIG. 13 is a rear perspective view of the device depicted in FIG. 11, with a rear mounting panel removed.
Figures 14, 15:
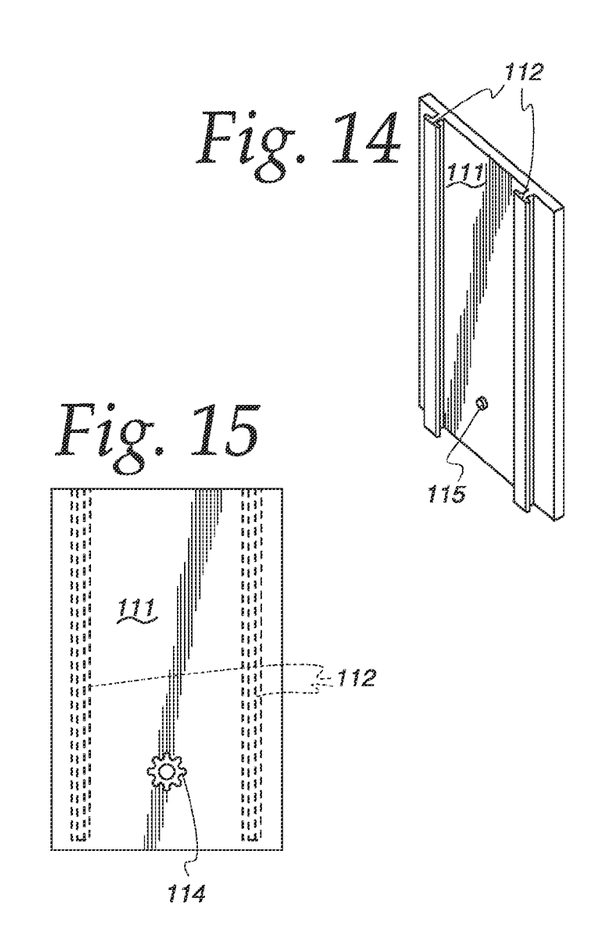
FIG. 14 is a perspective view of a rear mounting panel of the device depicted in FIG. 11.
FIG. 15 is a rear elevation view of the rear mounting panel of the device depicted in FIG. 11.

Optionally, device 104 may include a rear mounting panel 111 including sliding ribs 112 adapted for slidable connection to grooves 113 of housing 107 and a locking knob 114 and pin 115, similar to rear mounting panel 86 described above with respect to another embodiment. Following the appropriate adjustment of legs 116 in leg recesses 117 to position a top step 118 at the desired height relative to the top of mattress M, rear mounting panel 111 may then be vertically adjusted to the height of the top of box spring X to engage an edge portion 119 of retention sheet 106, between a vertical portion 120 and a horizontal portion 121 of sheet 106. In this manner, sheet 106 is constrained to a right-angle orientation even in the event that device 104 moves horizontally away from bed B, and any sliding horizontal displacement of device 104 away from bed B requires the same amount of displacement of edge portion 119, which is resisted by the frictional retention of sheet 106 between box spring X and mattress M. Alternatively, rear mounting panel 111 may be omitted, and device 104 may be substantially as illustrated in FIG. 13, while sliding grooves 113 may then also be omitted.

Figure 16:
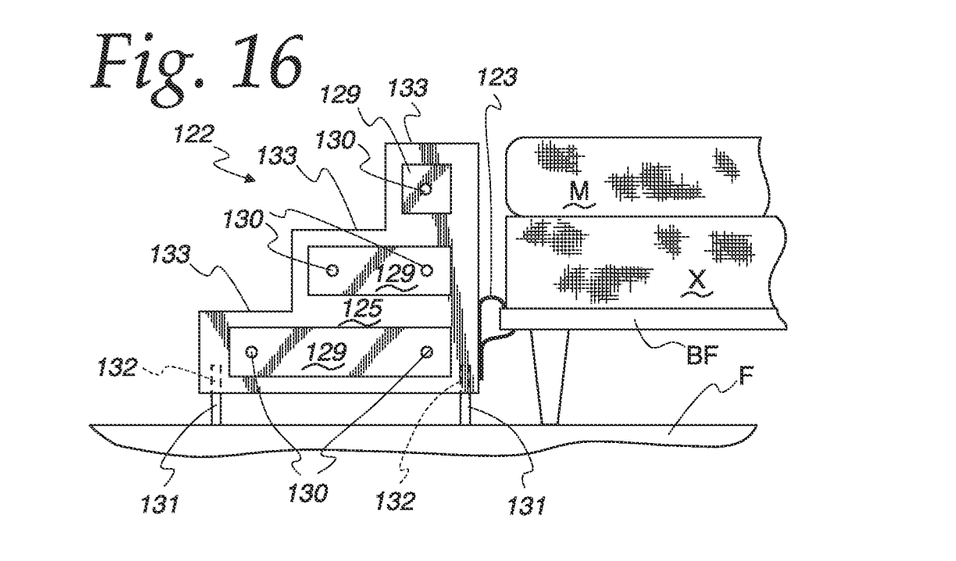
FIG. 16 is a side elevation view of still another alternative device shown in a use position.
Figure 17:
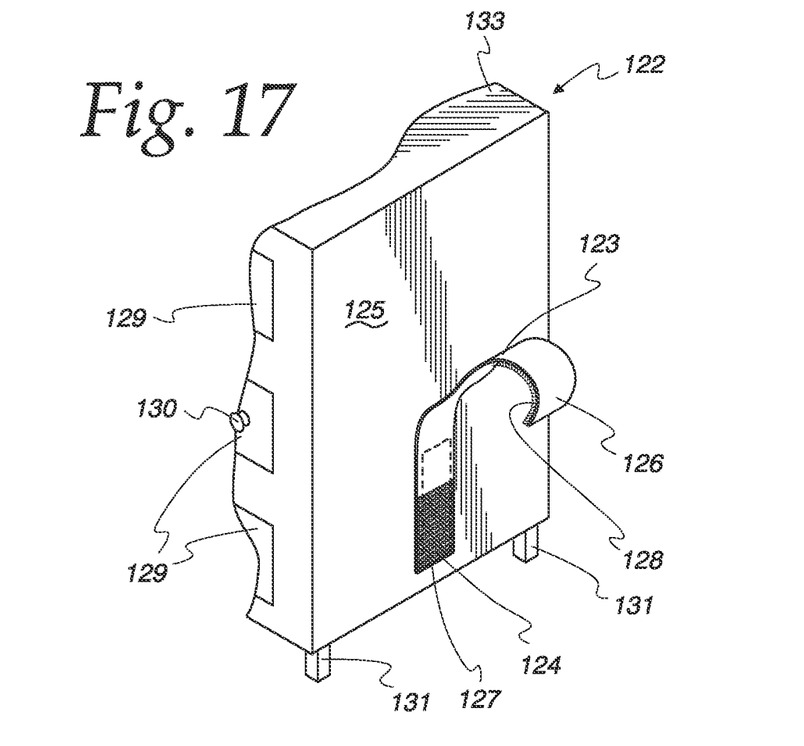
FIG. 17 is a rear perspective fragmentary view of the device depicted in FIG. 16.

With reference to FIGS. 16 and 17, still another embodiment of a bed step device according to the invention is depicted as bed step device 122. Bed step device 122 includes a flexible retention strap 123 attached at a proximal end 124 to a housing 125 and adapted to be inserted and frictionally retained between a box spring X and a bed frame BF. Flexible retention "strap" 123 is a specific example of a flexible retention "sheet" like those described above, where in this case the term "strap" is used to indicate a relatively narrower swath of material. Retention strap 123 need not be as wide as the flexible retention sheets described above to achieve the same frictional retention force, due to the typically much higher contact pressure between the opposed surfaces of a box spring and a bed frame, compared to that between the opposed surfaces of a mattress and a box spring. However, although using less material for retention strap 123 is likely desirable in most cases, the present invention does not arbitrarily limit the width of retention strap 123. As a further safeguard against undesired sliding of device 122 across a floor surface F, a distal end 126 of retention strap 123 extending from between box spring X and bed frame BF may optionally be detachably fastened to housing 125. For example, a patch 127 of material at proximal end 124 may be attached to the rear side of housing 125 to mate with a corresponding patch 128 of material at distal end 126 of retention strap 123 in a hook-and-loop fastener (e.g., such as a Velcro® fastener) type of connection. Similar to previously described embodiments, device 122 preferably includes drawers 129 with drawer pulls 130, adjustable legs 131 with corresponding leg recesses 132, and steps 133.

Although each of the foregoing bed step devices is illustrated as including a rigid, unitary housing comprising a plurality of steps, in many cases a single step that is short enough for a human or pet to easily step onto the step from a floor surface may also be tall enough to effectively assist the human or pet in climbing into the bed from a position standing on the single step, and thus a device having a single step would be sufficient to serve the purposes of a pet or human bed step device according to the invention. Such a single-step embodiment is illustrated in FIG. 18 as a top compartment 138.

Figure 18:
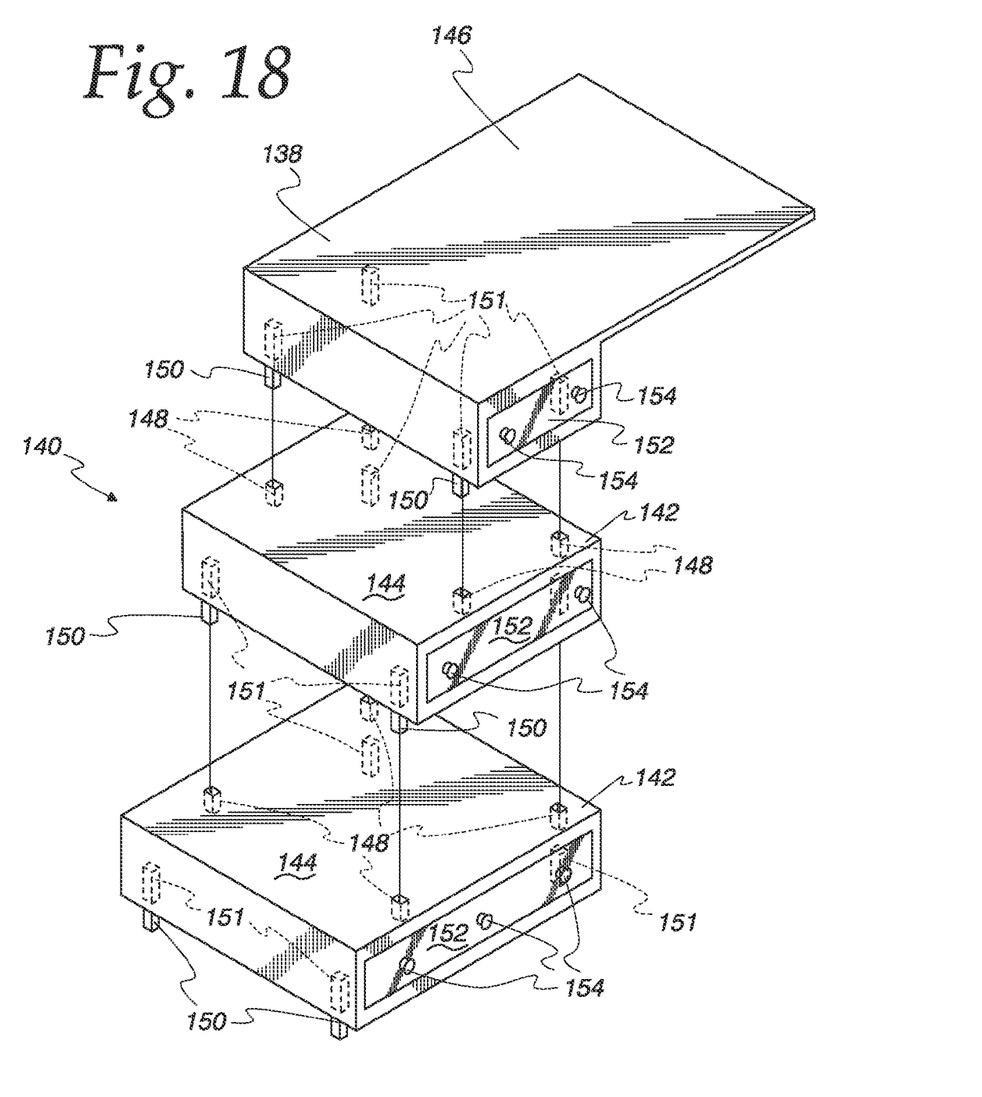
FIG. 18 is an exploded perspective view of a modular embodiment of a device according to the invention, also depicting a single-step device as a top component of the modular device.

Moreover, it will also be appreciated that the advantage of additional adaptability to different bed heights is provided by a modular bed step device 140 as also illustrated in FIG. 18. Device 140 includes top compartment 138 and one or more stackable lower compartments 142 of increasing length, each lower compartment including a step surface 144 comprising the portion of its top surface that exceeds the length of the bottom surface of the subsequently higher compartment. A retention panel 146 is attached to top compartment 138, and each lower compartment 142 includes mating recesses 148 configured to slidingly receive legs 150 of a subsequently higher compartment 142 or 138, which are preferably adjustably mounted in leg recesses 151 of the subsequently higher compartment 142 or 138. Preferably, each compartment incorporates its own storage space, which is depicted in FIG. 18 as a respective drawer 152 equipped with drawer pulls 154.

Figures 19, 20:
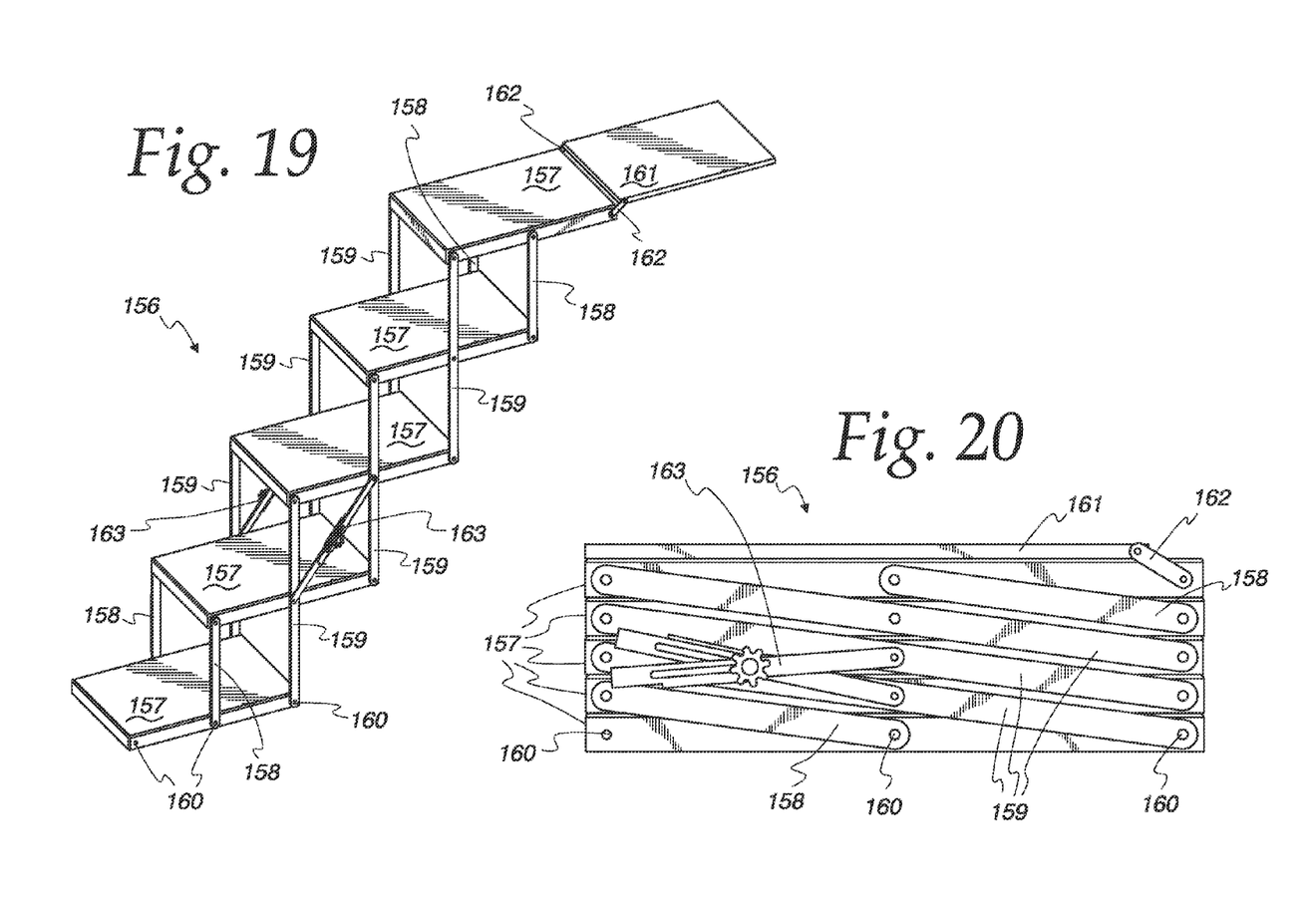
FIG. 19 is a perspective view of a folding staircase embodiment of a device according to the invention, shown in an open use position.
FIG. 20 is a side elevation view of the device depicted in FIG. 19, shown in a folded, compact, storage position.
Figures 23, 24, 25:
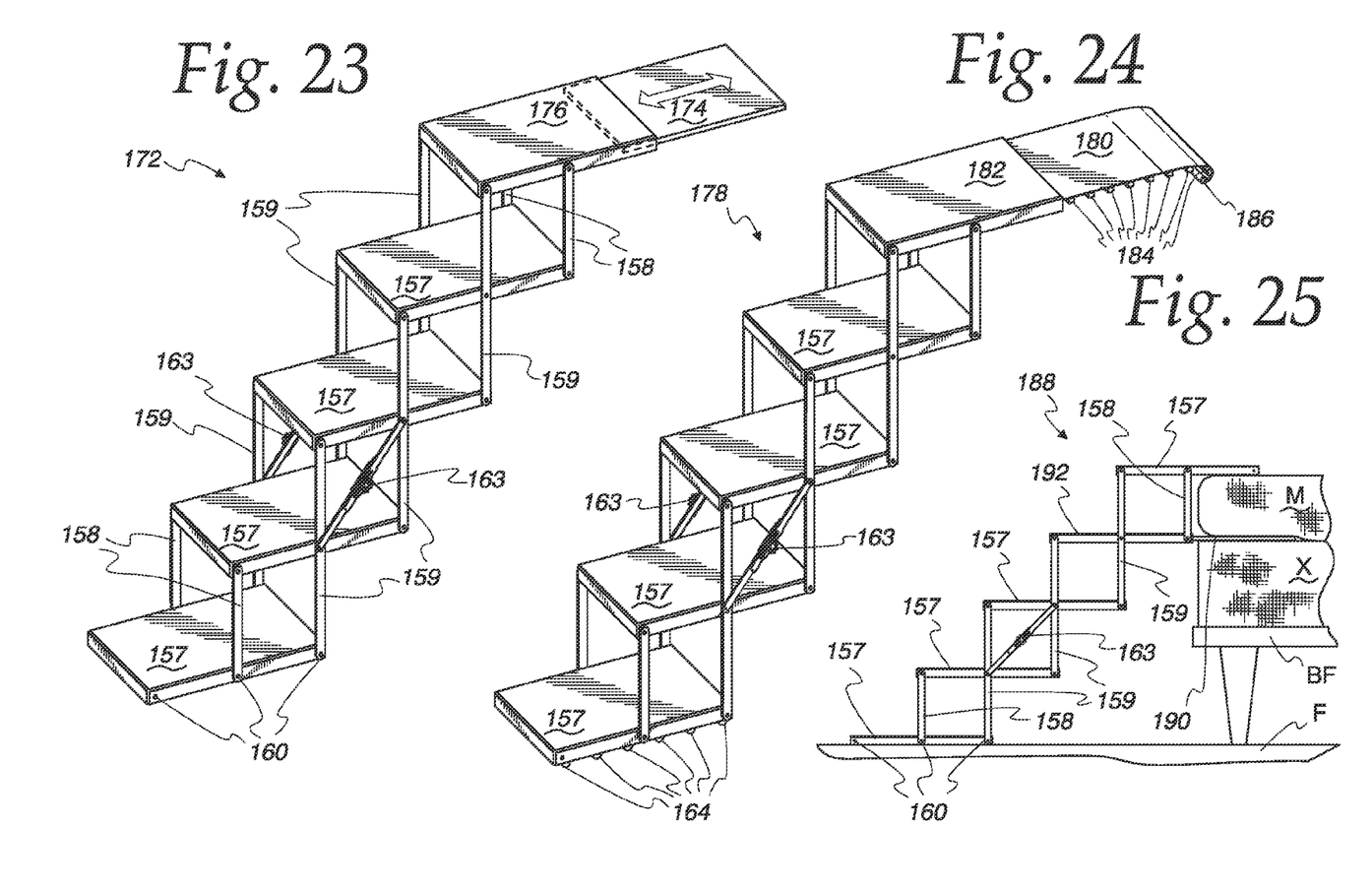
FIG. 23 is a perspective view of another alternative folding staircase device in an open use position.
FIG. 24 is a perspective view of still another alternative folding staircase device in an open use position.
FIG. 25 is a side elevation view of yet another alternative folding staircase device in a use position adjacent a bed.

Another aspect of the present invention is a folding staircase pet bed step device, exemplary embodiments of which are illustrated in FIGS. 19-25. Turning to FIGS. 19 and 20, a pet bed step device 156 is a four-bar linkage type of folding staircase, in which each step 157 of device 156 is connected by parallel pairs of side links 158, 159 to the two nearest higher steps 157, if any, and the two nearest lower steps 157, if any. This constrains all of steps 157 to remain parallel and each pair of adjacent steps 157 to be separated by the same vertical distance, thus mimicking the geometry of ordinary permanent staircases, with which pets tend to be familiar and comfortable from daily use. Preferably, all of steps 157 are identical in shape and include three evenly spaced apart holes 160 on each side to receive up to three pairs of pivotal links 158, 159, so that additional steps may be readily attached to device 156 to lengthen device 156 as desired. Device 156 includes a folding retention panel 161 connected at one end by a single pair of side links 162 to a front end of the uppermost of steps 157. FIG. 19 is an illustration of device 156 in an unfolded use configuration, with retention panel 161 unfolded from top step 157 and extending in a forward direction to be inserted and frictionally retained between a mattress and box spring, while FIG. 20 is an illustration of device 156 in a compact, box-shaped, folded storage configuration. One skilled in the art will note that when bottom step 157 is placed on a generally horizontal floor surface, device 156 may be unfolded to raise top step 157 to a plurality of different heights. One skilled in the art will understand that these heights range from the sum of the thicknesses of steps 157, as in the fully folded orientation seen in FIG. 20 or as in a fully opened orientation (not shown), to approximately the length of one of links 158 times one less than the number of steps 157, in an orientation in which each of links 158, 159 is oriented vertically, as seen in FIGS. 19, 23, 24 and 25. When top step 157 is raised to approximately the height of the gap between a mattress and box spring, retention panel 161 may then be unfolded to be inserted and frictionally retained between the mattress and box spring. When bottom step 157 is supported on a floor surface and retention panel 161 is so retained, the friction and normal forces from a mattress and box spring resisting sliding and pivotal movement of retention panel 161 may be sufficient to keep device 156 stationary as a pet climbs device 156. However, should additional stability be desired, a suitable locking mechanism such as locking mechanism 163 shown in FIGS. 19-25 may be included to lock device 156 in a desired orientation, and/or traction treads 164, as illustrated in FIG. 24, may be included on a bottom side of bottom step 157 to further resist sliding movement of bottom step 157 across a floor surface.

Figures 21, 22:
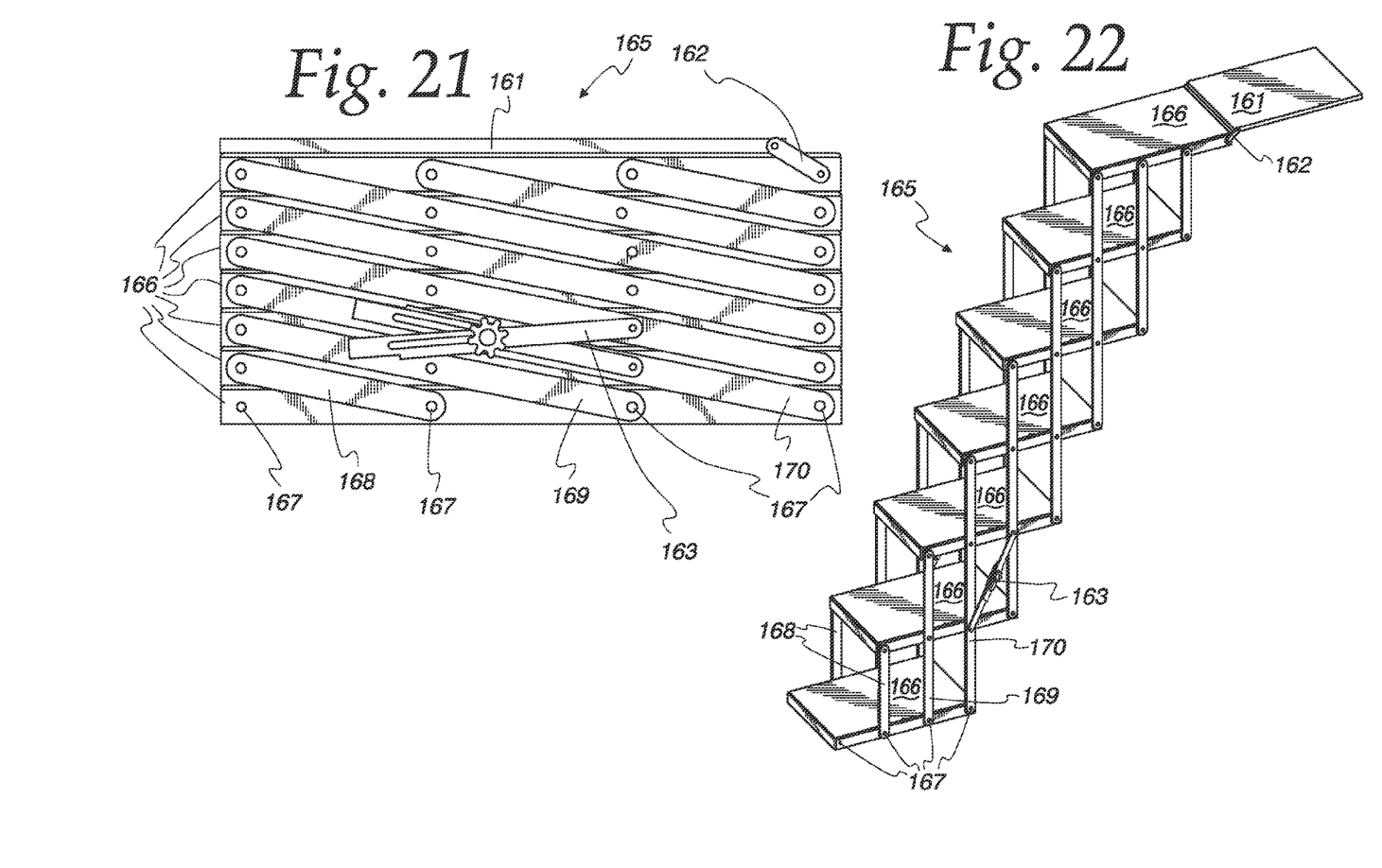
FIG. 21 is a side elevation view of an alternative folding staircase device, shown in a folded position.
FIG. 22 is a perspective view of the device depicted in FIG. 21, shown in an open use position.

It should be noted that any suitable linkage by which steps are constrained to be parallel and separated by a uniform spacing is within the scope of the invention. As but one additional example, instead of each step 157 having three link attachment holes 160 and sharing a link in common with up to four nearest neighbors (up to two above and two below), an alternative pet bed step device 165 may instead have steps 166 with four link attachment holes 167, so that each step 166 shares at least one link 168, 169, 170 in common with up to six nearest neighbors (up to three above and three below), as shown in FIGS. 21 and 22. One skilled in the art will note that increasing the number of evenly spaced link attachment holes on a step of a given length decreases the maximum vertical spacing between adjacent steps, which is slightly larger than the spacing between link attachment holes. Thus, increasing the number of attachment holes provides a staircase that is more easily climbed by a smaller pet when opened with the links in a vertical position, for an approximately 45° staircase incline, while also providing the benefit of greater structural stability resulting from more interconnectivity of the linkage. Even more than four link attachment holes per step would provide for still more link connections as desired.

Turning to FIG. 23, another embodiment of a folding staircase device according to the present invention is illustrated as pet bed step device 172. Device 172 is similar to device 156 as illustrated in FIGS. 19-20, but instead of a folding retention panel, device 172 includes a linearly extending and retracting retention panel 174, which is slidingly received in a top step 176.

With reference to FIG. 24, still another embodiment of a folding staircase device according to the invention is illustrated as pet bed step device 178. Device 178 is similar to devices 156 and 172 as described above, while device 178 includes a flexible retention sheet 180 in lieu of a rigid retention panel. Retention sheet 180 is attached to a top step 182, and optionally includes traction ribs 184, which may be affixed to or hemmed into retention sheet 180, and/or a spooling rod 186 to facilitate rolling up retention sheet 180 for storage. Retention sheet 180 may be inserted between a mattress and box spring either by lifting up the mattress, rolling out retention sheet 180 onto the box spring, and lowering the mattress onto retention sheet 180, or by grasping spooling rod 186 and pushing spooling rod 186 between the mattress and box spring until retention sheet 180 is taut. In the latter case, the relative rigidity of spooling rod 186 assures that the leading edge of retention sheet 180 is fully and evenly extended between the mattress and box spring, without the need to lift the mattress to confirm visually that retention sheet 180 is evenly rolled out.

Turning to FIG. 25, yet another embodiment of a folding staircase device according to the invention is illustrated as pet bed step device 188. Device 188 is similar to device 172 illustrated in FIG. 23, except that an extending and retracting retention panel 190 is slidingly received in its second highest step 192 instead of its top step 157. In this manner, device 188 is configured so that top step 157 may rest on top of a mattress M while retention panel 190 is received between mattress M and box spring X of a bed B, thus providing additional stability to device 188. For greater adaptability to various heights and thicknesses of mattress M, a flexible retention sheet similar to retention sheet 180 may be substituted for retention panel 190.

While the invention has been described with respect to certain preferred embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A portable bed step device for assisting a human or pet in climbing into a bed, comprising:
    a rigid bed step member supportable by a generally horizontal floor surface;
    a plurality of rigid steps, including a lowest step, disposed in fixed positions relative to the bed step member, each step including a generally horizontal support surface configured to be elevated above the generally horizontal floor surface when the bed step member is supported thereon in a use position;
    a rigid, elongate retention member connected to the bed step member, the retention member adapted to be disposed and frictionally retained between opposed surfaces of the bed, when the portable bed step device is in the use position adjacent to the bed, to resist movement of the device, including horizontal sliding movement of the device, away from the use position, at least one of the plurality of steps in the use position being disposed below the vertical level of the retention member, the resistance of the retention member to bending or pivoting relative to the bed step member further resisting upward or downward vertical movement of any of the plurality of steps;

an at least substantially vertical rear side of the bed step member when in the use position disposed generally parallel and directly adjacent to the bed, the rear side extending at least from the vertical level of the retention member approximately to the floor surface, the bed step member contacting the floor surface proximate to the bottom of the rear side of the bed step member, and the bed step member contacting the floor surface proximate to the front of the lowest step, to at least substantially prevent downward movement of any of the steps;

an at least substantially enclosed storage compartment disposed below the support surface; and floor-contacting members extendably and retractably connected to the bed step member to adjust the height of the bed step member and the support surface relative to the generally horizontal floor surface.

2. The device of claim 1, the retention member being rigidly connected to the bed step member.

3. The device of claim 1, the retention member being a thin, rigid retention panel being supported above a topmost of the steps.

4. The device of claim 3, the retention panel being supported in a generally horizontal position by a vertical panel comprising a portion of the rear side of the device.

5. The device of claim 4, comprising a plurality of retention panels horizontally slidingly connected to the bed step member, the plurality of retention panels being spaced apart vertically from one another.

6. The device of claim 3, the retention panel being horizontally slidingly connected to the bed step member, for movement to and from an extended position and a retracted position relative to the bed step member, the retention panel being configured to be disposed and retained between the opposed surfaces when in the extended position, and the device being generally more compact when the retention panel is in the retracted position.

7. The device of claim 3, the retention panel being vertically slidingly connected to the bed step member for adjustment of the height of the retention panel to the height of the opposed surfaces for disposing and retaining the retention panel between the opposed surfaces.

8. The device of claim 3, further comprising a rear mounting panel vertically slidingly connected to the rear side of the device for adjustment of the height of the retention panel to the height of the opposed surfaces, the retention panel being pivotally connected to the rear mounting panel for movement to and from a folded storage position and an unfolded use position for retention of the retention panel between the opposed surfaces.

9. The device of claim 3, the retention panel being pivotally connected to the bed step member for movement to and from a folded storage position and an unfolded use position for retention of the retention panel between the opposed surfaces.

10. The device of claim 9, comprising a second support surface connected to the first support surface by a second linkage, the second linkage adapted to permit movement of the second support surface to a range of positions at a range of heights above the first support surface, while constraining the second support surface to remain generally parallel to the first support surface.

11. The device of claim 9, the linkage comprising at least two substantially parallel side links pivotally connected to the bed step member and to the support surface, the substantially parallel side links having substantially parallel, spaced apart pivotal axes.

12. The device of claim 9, the retention member comprising a flexible sheet.

13. The device of claim 1, the retention member comprising a thin, rigid retention panel configured to be disposed and retained between opposed surfaces of a mattress and a box spring.

14. A portable bed step device for assisting a human or pet in climbing into a bed, comprising:

a bed step member configured to be supported on a generally horizontal floor surface and having a plurality of steps connected thereto, each step including a generally horizontal support surface configured to be elevated above the generally horizontal floor surface when the bed step member is supported thereon in a use position, the bed step member contacting the floor surface over an area approximately equal to the area of each support surface;

floor grip members attached to the bed step member and configured to directly contact a floor surface on which the bed step member is supported, the floor grip members composed of a high-traction material to resist sliding of the grip members across the floor surface;

an elongate retention member connected to the device, the retention member having a thickness smaller than a vertical thickness of the step, the retention member adapted to be disposed and retained between opposed surfaces of the bed, when the device is in the use position adjacent to the bed, to resist movement of the device away from the use position, at least one of the plurality of steps in the use position being disposed below the vertical level of the retention member; and a linkage movably connecting the support surface to the bed step member;

the linkage adapted to permit movement of the support surface to a range of positions at a range of heights above a floor surface on which the bed step member is supported, while constraining the support surface to remain generally parallel to the floor surface.

15. A portable bed step device for assisting a human or pet in climbing into a bed, comprising:

a rigid bed step member supportable by a generally horizontal floor surface;

a plurality of rigid steps disposed in fixed positions relative to the bed step member, each step including a generally horizontal support surface configured to be elevated above the generally horizontal floor surface when the bed step member is supported thereon in a use position;

a flexible retention member connected to the bed step member, at least a portion of the flexible retention member adapted to be disposed and frictionally retained between opposed surfaces of the bed at a vertical level above at least one of the plurality of steps in the use position, when the portable bed step device is in the use position adjacent to the bed, to resist movement of the device, including horizontal sliding movement of the device, away from the use position;

an at least substantially vertical rear side of the bed step member in the use position disposed generally parallel and directly adjacent to the bed, the bed step member contacting the floor surface proximate to the bottom of the rear side of the bed step member, and the bed step member contacting the floor surface proximate to the front of the foremost step, to at least substantially prevent downward movement of any of the plurality of steps;

an at least substantially enclosed storage compartment disposed below the support surface; and floor-contacting members extendably and retractably connected to the bed step member to adjust the height of the bed step member and the support surface relative to the generally horizontal floor surface.

16. The device of claim 15, the rear side in the use position extending at least from a vertical level of the rearmost step approximately to the floor surface.

17. The device of claim 15, further comprising a rod attached to an end of the frictionally retainable portion of the flexible retention member, configured for rolling the flexible retention member onto the rod.

18. The device of claim 15, further comprising a plurality of transverse ribs attached to the flexible retention member in a longitudinally spaced-apart relationship.

19. The device of claim 15, a proximal end of the flexible retention member being attached to the bed step member, the flexible retention member being configured to be disposed and retained between opposed surfaces of a box spring and a bed frame, further comprising means for removably fastening a distal end of the flexible retention member extending from between the opposed surfaces to the bed step member.

20. The device of claim 15, further comprising a guide panel vertically slidingly connected to the rear side of the device for adjustment of the vertical level of a top edge of the guide panel, to guide the flexible retention member over the top edge of the guide panel at the vertical level of the opposed surfaces, to constrain the flexible retention member to a substantially right-angle orientation.

\* \* \* \* \*